(12) United States Patent
Duis et al.

(10) Patent No.: US 9,798,162 B2
(45) Date of Patent: Oct. 24, 2017

(54) ANNULAR SHAPED CLEAR LAYER IN COSMETIC CONTACT LENSES

(71) Applicant: Johnson & Johnson Vision Care, Inc., Jacksonville, FL (US)

(72) Inventors: Donnie Jerome Duis, Jacksonville, FL (US); Angie Leen Bowers, Jacksonville, FL (US); Eric Jason Oppelt, St. Johns, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 14/644,511

(22) Filed: Mar. 11, 2015

(65) Prior Publication Data
US 2016/0266403 A1  Sep. 15, 2016

(51) Int. Cl.
*G02C 7/04* (2006.01)
*G02C 7/02* (2006.01)

(52) U.S. Cl.
CPC ............. *G02C 7/046* (2013.01); *G02C 7/021* (2013.01); *G02C 7/04* (2013.01); *G02C 2202/16* (2013.01)

(58) Field of Classification Search
CPC .......... G02C 7/04; G02C 7/046; G02C 7/021; G02C 2202/16
USPC ............... 351/159.29, 159.3, 159.31, 159.32
See application file for complete search history.

(56) References Cited

U.S. PATENT DOCUMENTS

| | | | | |
|---|---|---|---|---|
| 3,536,386 A | * | 10/1970 | Spivack | G02C 7/046 351/159.02 |
| 4,615,593 A | * | 10/1986 | Neefe | G02C 11/02 351/159.24 |
| 5,723,541 A | * | 3/1998 | Ingenito | G02B 1/043 525/464 |
| 7,278,736 B2 | | 10/2007 | Ocampo et al. | |
| 9,104,042 B2 | * | 8/2015 | Bowers | G02C 7/046 |
| 2002/0167640 A1 | * | 11/2002 | Francis | B29D 11/00317 351/159.28 |
| 2003/0035083 A1 | * | 2/2003 | Francis | B29D 11/00038 351/159.02 |
| 2003/0117576 A1 | | 6/2003 | Thakrar et al. | |
| 2004/0114101 A1 | | 6/2004 | Thrakrar | |
| 2005/0185134 A1 | | 8/2005 | Ocampo et al. | |
| 2006/0181676 A1 | * | 8/2006 | Tucker | G02C 7/046 351/159.24 |
| 2011/0040376 A1 | * | 2/2011 | Christie | A61F 2/1613 623/6.17 |
| 2011/0069276 A1 | * | 3/2011 | Tucker | G02C 7/046 351/159.24 |
| 2012/0026459 A1 | * | 2/2012 | Tucker | B29D 11/00903 351/159.24 |

(Continued)

FOREIGN PATENT DOCUMENTS

CN  204065581  12/2014
GB  1163617 A  9/1969

Primary Examiner — William R Alexander
(74) Attorney, Agent, or Firm — Carl J. Evens

(57) ABSTRACT

Contact lenses comprising designs/colorants may be utilized to enhance and/or highlight the appearance of the eyes upon which the contact lenses are positioned. These contact lenses comprise a substantially annular shaped clear layer on the front curve surface to completely encapsulate the designs/colorants within the contact lens. The annular shape provides no clear coat over the optic region thereby ensuring high optical quality.

6 Claims, 12 Drawing Sheets

(56) References Cited

U.S. PATENT DOCUMENTS

| | | | | |
|---|---|---|---|---|
| 2012/0147319 A1* | 6/2012 | Corti | ............. | G02C 7/046 |
| | | | | 351/159.3 |
| 2013/0268071 A1* | 10/2013 | Vilupuru | ............. | A61B 3/102 |
| | | | | 623/6.17 |
| 2014/0253871 A1* | 9/2014 | Rosser | ............. | G02C 7/046 |
| | | | | 351/159.24 |
| 2014/0268024 A1* | 9/2014 | Pugh | ............. | G02C 7/048 |
| | | | | 351/159.24 |
| 2015/0277148 A1* | 10/2015 | Wright | ............. | G02C 7/046 |
| | | | | 351/159.24 |
| 2016/0041407 A1* | 2/2016 | Chou | ............. | G02C 7/046 |
| | | | | 351/159.24 |

\* cited by examiner

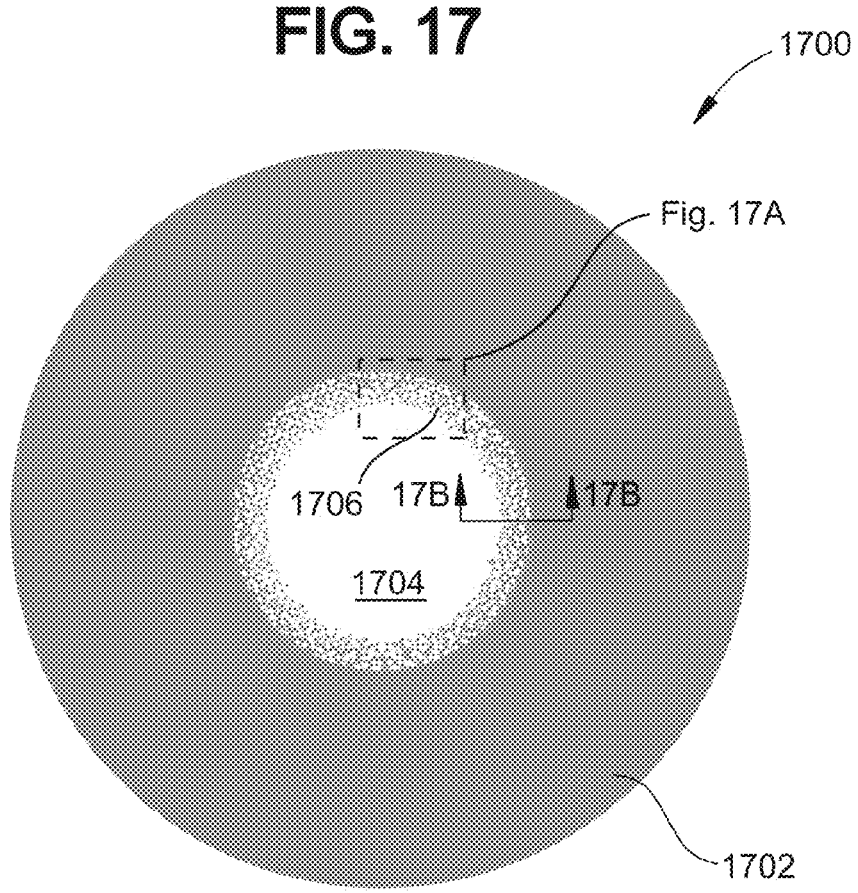
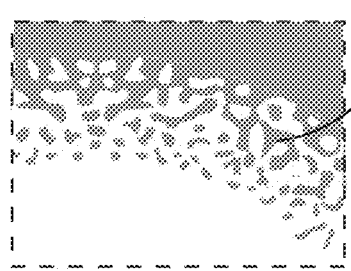
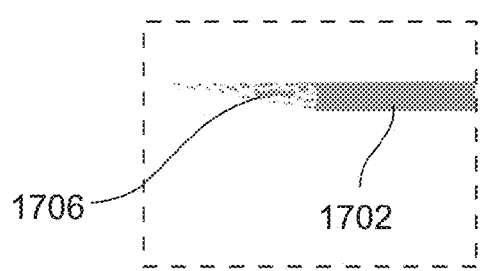

ANNULAR SHAPED CLEAR LAYER IN COSMETIC CONTACT LENSES

BACKGROUND OF THE INVENTION

1. Field of the Invention

The present invention relates to ophthalmic lenses, and more particularly to cosmetic contact lenses incorporating one or more effect layers and/or one or more pigmented printed layers to enhance the appearance of the eyes upon which the contact lenses are positioned. The cosmetic contact lenses also comprising an annular shaped clear layer to encapsulate the one or more effect and/or pigmented printed layers to provide safe, comfortable, and high optical quality contact lenses.

2. Discussion of the Related Art

Contact lenses or contacts are simply lenses placed on the eye. Contact lenses are considered medical devices and may be worn to correct vision and/or for cosmetic or other therapeutic reasons. Contact lenses have been utilized commercially to improve vision since the 1950s. Early contact lenses made or fabricated from hard materials were relatively expensive and fragile. In addition, these early contact lenses were fabricated from materials that did not allow sufficient oxygen transmission through the contact lens to the conjunctiva and cornea which potentially could cause a number of adverse clinical effects. Although these contact lenses are still utilized, they are not suitable for all patients due to their poor initial comfort. Later developments in the field gave rise to soft contact lenses, based upon hydrogels, which are extremely popular and widely utilized today. Silicone hydrogel contact lenses that are available today combine the benefit of silicone, which has extremely high oxygen permeability, with the proven comfort and clinical performance of hydrogels. Essentially, these silicone hydrogel based contact lenses have higher oxygen permeability values and are generally more comfortable to wear than the contact lenses made of the earlier hard materials. Rigid gas permeable hard contact lenses, on the other hand, are made from siloxane-containing polymers but are more rigid than soft contact lenses and thus hold their shape and are more durable.

Currently available contact lenses remain a cost effective means for vision correction. The thin plastic lenses fit over the cornea of the eye to correct vision defects, including myopia or nearsightedness, hyperopia or farsightedness, astigmatism, i.e. asphericity in the cornea, and presbyopia i.e. the loss of the ability of the crystalline lens to accommodate. Contact lenses are available in a variety of forms and are made of a variety of materials to provide different functionality. Daily wear soft contact lenses are typically made from soft polymer materials combined with water for oxygen permeability. Daily wear soft contact lenses may be daily disposable or extended wear disposable. Daily disposable contact lenses are usually worn for a single day and then thrown away, while extended wear disposable contact lenses are usually worn for a period of up to thirty days. Colored soft contact lenses use different materials to provide different functionality. For example, a visibility tint contact lens uses a light tint to aid the wearer in locating a dropped contact lens, enhancement tint contact lenses have a transparent or translucent tint that is meant to enhance one's natural eye color, the color tint contact lens comprises an opaque tint meant to change one's eye color, and the light filtering tint contact lens functions to enhance certain colors while muting others. Bifocal and multifocal contact lenses are designed specifically for patients with presbyopia and are available in both soft and rigid varieties. Toric contact lenses are designed specifically for patients with astigmatism and are also available in both soft and rigid varieties. Combination lenses combining different aspects of the above are also available, for example, hybrid contact lenses.

Cosmetic contact lenses may comprise patterns composed of one or more elements that completely, or more preferably, partially overlie the wearer's iris. These lenses may also comprise a limbal ring. A limbal ring is essentially an annular band of color that when the lens is on the eye and centered, partially or completely overlies the lens wearer's limbal region which is the junction of the sclera and the cornea. The inclusion of a limbal ring may make the iris appear larger, darker and/or more defined. The combination of the limbal ring and an iris pattern makes the appearance of the lens on eye more natural. In other words, an iris pattern allows the limbal ring to blend in naturally with the wearer's eyes.

Other cosmetic contact lenses focus on the sclera rather than or in addition to the iris. For example, a contact lens may comprise a brightly colored peripheral portion, i.e. outside of the iris region, that may be opaque, semi-opaque and/or translucent. The bright portion may extend from the edge of the limbus to the edge of the contact lens creating the impression of a brighter or whiter sclera. These contact lenses may also include a limbal ring which as stated above, may make the iris appear larger, darker and/or more defined than it would otherwise.

In all of the above-described contact lenses, a clear coat is utilized to fully encapsulate the various designs/patterns; namely, the one or more effect and/or pigmented printed layers within the contact lens. Currently, this clear coat covers the entire front curve surface of the contact lens. In order to maintain the precision optical surface and pathway, there exists a need in the cosmetic contact lens area for lenses with uncompromised optical quality while maintaining the functionality associated with full pigment encapsulation.

SUMMARY OF THE INVENTION

The cosmetic contact lens with an annular shaped clear layer to encapsulate one or more effect layers and/or one or more pigmented printed layers of the present invention overcomes the issues briefly set forth above.

In accordance with one aspect, the present invention is directed to a cosmetic contact lens. The cosmetic contact lens comprising an annular shaped clear coat layer formed from a first material, one or more effect layers affixed to the annular shaped clear coat layer, and bulk lens material covering and surrounding both the annular shaped clear coat layer and the one or more effect layers.

In accordance with another aspect, the present invention is directed to a contact lens. The contact lens comprising a front curve surface formed from a first material, a back curve surface formed from the first material, and an annular shaped layer formed from a second material and affixed to at least one of the front and back curve surfaces, the annular shaped layer comprising a first annular section, a transition section and an optic area opening section.

Cosmetic contact lenses may be designed to alter the appearance of the eyes upon which they are worn in any number of ways, including the color of the entire eye and/or different regions of the eye. While not a requirement, cosmetic contact lenses may also be utilized to correct refractive error. Cosmetic contact lenses may also have a direct medical application. For example, cosmetic contact lenses may be utilized to restore the appearance of a damaged eye. Cosmetic contact lenses may include transparent, translucent, opaque-color enhancements or tints. Tints may include organic/inorganic pigments, dyes or special effect pigments. Printed regions on the contact lens may include the iris region (iris patterns), the limbal region (limbal rings), the scleral region (sclera brightening), or any combination thereof. In addition, patterns may be continuous, intermittent or any combination thereof.

The present invention utilizes an annular shaped clear base coat layer to completely encapsulate the enhancements and/or tints while providing an opening in the optical zone to provide high quality visual performance. The cosmetic contact lenses of the present invention provide a cost effective means to enhance the visual appearance of a wearer's eyes while providing the optical quality and comfort of a non-cosmetic contact lens.

BRIEF DESCRIPTION OF THE DRAWINGS

The foregoing and other features and advantages of the invention will be apparent from the following, more particular description of preferred embodiments of the invention, as illustrated in the accompanying drawings.

FIG. 17 is a diagrammatic representation of an exemplary clear base cliché in accordance with the present invention.

FIG. 17A is an exploded view of a section of the clear base cliché in accordance with the present invention.

FIG. 17B is an exploded cross section of the clear base cliché in accordance with the present invention.

DETAILED DESCRIPTION OF THE PREFERRED EMBODIMENTS

Contact lenses or contacts are simply lenses placed on the eye. Contact lenses are considered medical devices and may be worn to correct vision and/or for cosmetic or other therapeutic reasons. Contact lenses have been utilized commercially to improve vision since the 1950s. Early contact lenses made or fabricated from hard materials were relatively expensive and fragile. In addition, these early contact lenses were fabricated from materials that did not allow sufficient oxygen transmission through the contact lens to the conjunctiva and cornea which potentially could cause a number of adverse clinical effects. Although these contact lenses are still utilized, they are not suitable for all patients due to their poor initial comfort. Later developments in the field gave rise to soft contact lenses, based upon hydrogels, which are extremely popular and widely utilized today. Silicone hydrogel contact lenses that are available today combine the benefit of silicone, which has extremely high oxygen permeability, with the proven comfort and clinical performance of hydrogels. Essentially, these silicone hydrogel based contact lenses have higher oxygen permeabilities and are generally more comfortable to wear than the contact lenses made of the earlier hard materials. However, these new contact lenses are not totally without limitations.

Figure 1:
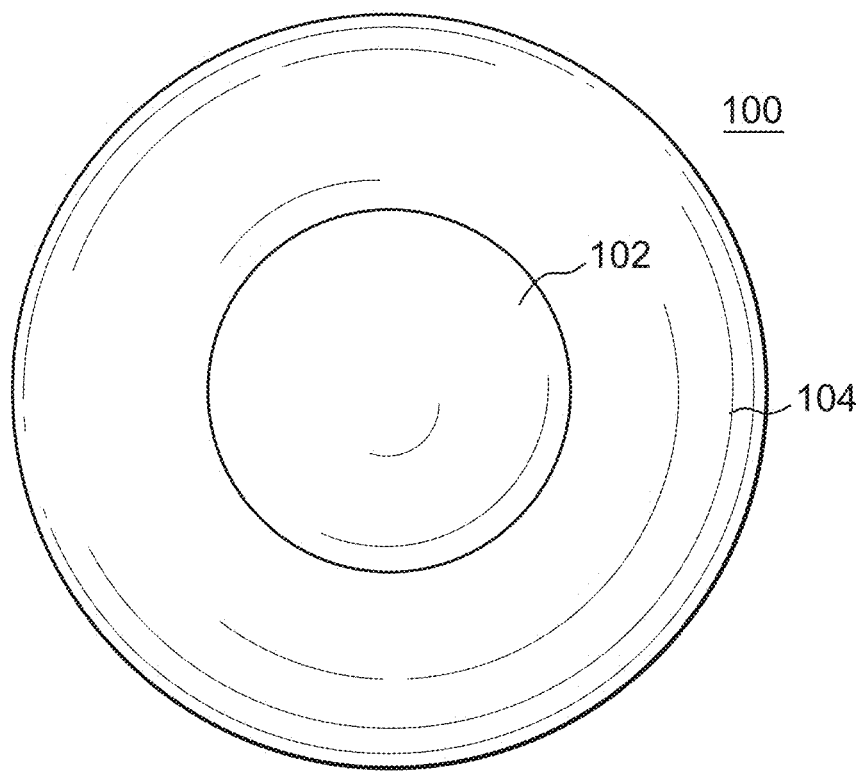
FIG. 1 is a plan view of an exemplary non-cosmetic contact lens.

Referring now to FIG. 1, there is illustrated a plan view of an exemplary non-cosmetic contact lens 100. The contact lens 100 comprises an optic zone 102, a peripheral zone 104 surrounding the optic zone 102, a back curve surface designed to make contact with an individual's eye when worn and a front curve surface opposite the back curve surface. The optic zone 102 is the portion of the contact lens 100 through which vision correction may be obtained. In other words, the optic zone 102 provides vision correction and is designed for a specific need such as single vision myopia or hyperopia correction, astigmatism vision correction, bi-focal vision correction, multi-focal vision correction, custom correction or any other design that may provide vision correction. The peripheral zone 104 surrounds the optic zone 102 and provides mechanical stability for the contact lens 100 on the eye. In other words, the peripheral zone 104 provides mechanical features which influence positioning and stabilization of the contact lens 100 on the eye, including centration and orientation. Orientation is fundamental when the optic zone 102 includes non-rotationally symmetric features, such as astigmatic correction and/or high order aberration correction. In some contact lens designs, an optional intermediate zone between the optic zone 102 and the peripheral zone 104 may be utilized. The optional intermediate zone ensures that the optic zone 102 and the peripheral zone 104 are smoothly blended.

The lens 100 illustrated in FIG. 1 is circular, but may be any convenient shape for a contact lens, such as an elliptical or truncated circular shape. In addition to being round or non-round, the contact lens 100 may be planar or non-planar.

A cosmetic contact lens is designed to enhance or alter the appearance of the eye upon which it is worn. While not a requirement, cosmetic contact lenses may also be utilized for the correction of refractive error. In addition, cosmetic contact lenses may also have direct medical application, for example, to restore the appearance of a damaged eye. Individuals who suffer from aniridia, the absence of an iris, or dyscoria, damage of the iris, may utilize colored contact lenses that will give the appearance of a complete iris. Cosmetic contact lenses may include translucent/transparent color enhancement, tint, opaque color tint, artificial iris patterns, limbal rings, sclera brightening tints and/or any combination of the above.

More specifically, cosmetic contact lenses may be utilized to brighten the sclera and/or have a pattern that includes a limbal ring that serves to enhance the definition of the wearer's iris resulting in the iris appearing larger to viewers of the lens wearer. Additionally, cosmetic contact lenses may have additional pattern elements that completely or, preferably, partially overlie the wearer's iris. The cosmetic lenses may be utilized for enhancing a dark-eyed individual's iris, but also may be used to enhance the iris of a light-eyed lens wearer as well.

Figure 2:
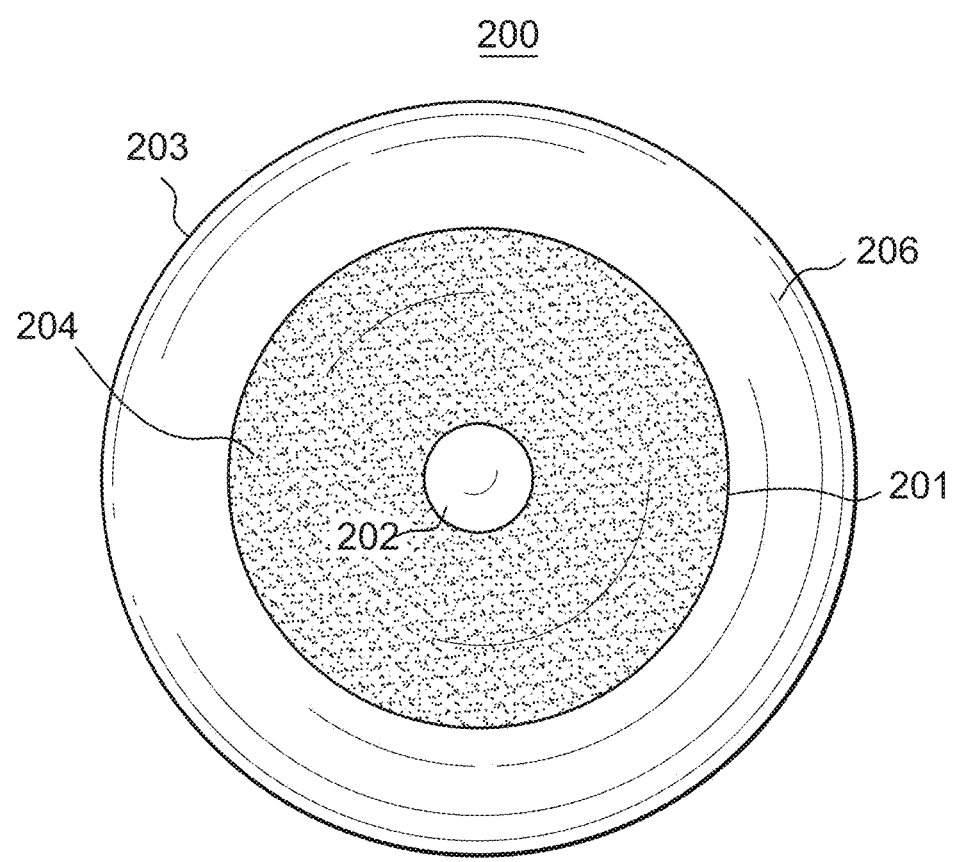
FIG. 2 is a plan view of a first exemplary cosmetic contact lens.

Referring to FIG. 2, there is illustrated a first exemplary cosmetic contact lens 200. While this lens 200 comprises an optic zone and a peripheral zone within the meaning set forth above with respect to the contact lens 100 of FIG. 1, different terms are utilized to describe the various regions of a cosmetic contact lens. The cosmetic contact lens 200 comprises a center region 202 that is sized to substantially correspond to the size and location of an individual pupil. The center region 202 typically has no coloring or design so as not to interfere with visual acuity. A central portion 204 surrounds the center region 202 and is sized to substantially correspond to the size and location of an individual's iris. The central portion 204 may comprise one or more colors and/or a pattern formed by one or more colors to enhance the appearance of the wearer's iris. Disposed about the central portion 204 and extending to the surrounding edge of the contact lens 200 is a peripheral portion 206. The peripheral portion 206 comprises an annular shape with an inner diameter measured from point 201 and an outer diameter measured from point 203 which may, but need not necessarily coincide with the outer edge of the contact lens 200 as a whole. The peripheral portion 206 may be colored with a bright color, for example, white, near white, off white, light yellow, pale blue, light pink, light green or any combination of the above. The bright colors are disposed so as to blend gradually with the wearer's sclera.

The peripheral portion 206 is colored to enhance the appearance of the sclera. The coloring of the peripheral portion 206 may be opaque, translucent, or somewhere between the two, or semi-opaque. Exemplary embodiments enhance the appearance of the sclera by providing the sclera with a refreshed, natural appearance. Opaque as utilized herein shall be understood to mean a color that permits an average light transmittance in the 380 to 780 nm range of 0 to about 50 percent, and preferably 7 to about 50 percent. Translucent as utilized herein shall be understood to mean a color that permits an average light transmittance in the 380 to 780 nm range of about 50 to about 85 percent, and preferably from about 65 to about 85 percent.

Figure 3:
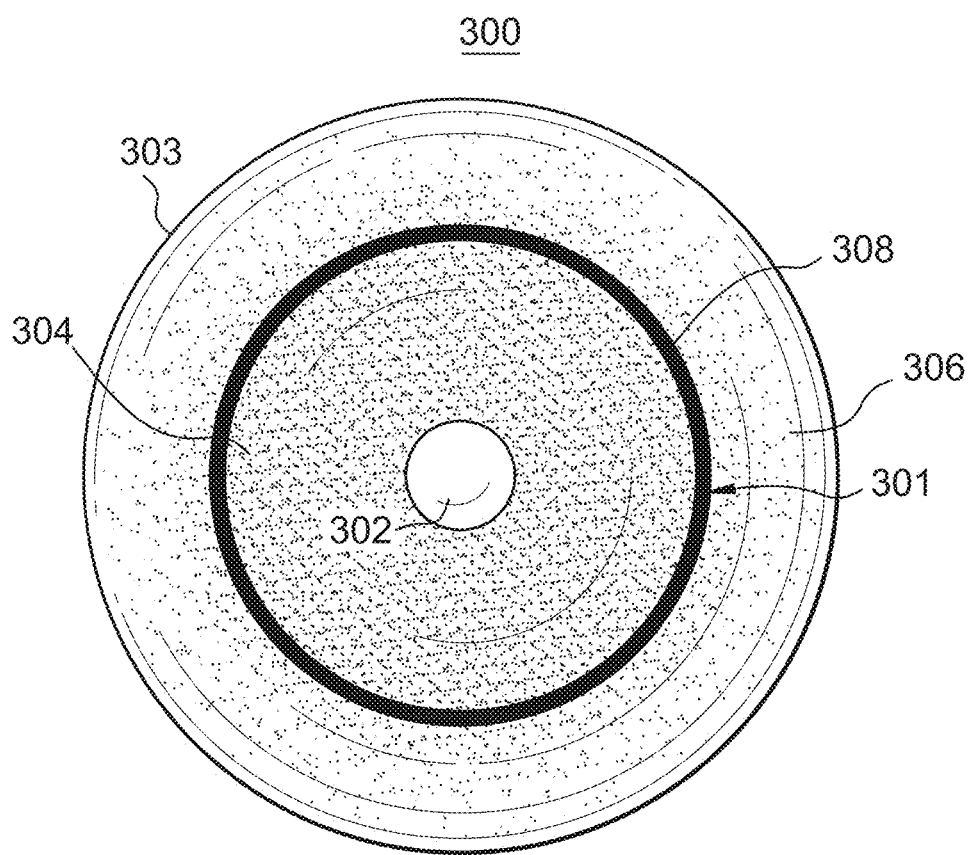
FIG. 3 is a plan view of a second exemplary cosmetic contact lens.

FIG. 3 illustrates a second exemplary cosmetic contact lens 300. The cosmetic contact lens 300 comprises a center region 302, a central portion 304 that surrounds the center region 302, a peripheral portion 306 that surrounds the central portion 304 and a limbal ring 308. As set forth herein, a limbal ring is essentially an annular band of color that, when the lens is on the eye and centered, partially or completely overlies the lens wearer's limbal region. In some exemplary embodiments, a limbal ring may be larger to create a halo effect. In this exemplary embodiment, the coloring in the peripheral portion 306 is or may be graduated from opaque to translucent or transparent from the inner diameter measured from point 301 to the outer diameter measured from point 303. As in the previously described exemplary embodiment, the central portion 304 may comprise one or more colors and/or a pattern formed by one or more colors to enhance the appearance of the wearer's iris. This combination provides the most natural iris along with the contrast of a dark limbal ring, while providing the additional benefit of a bright coloring applied in the peripheral portion 306. The limbal ring 308 may be of any suitable width or pattern that allows the ring 308 to blend naturally with the iris, the central portion coloring/pattern 304 and the bright colored peripheral portion 306. The limbal ring 308 may be translucent or opaque.

Figure 4:
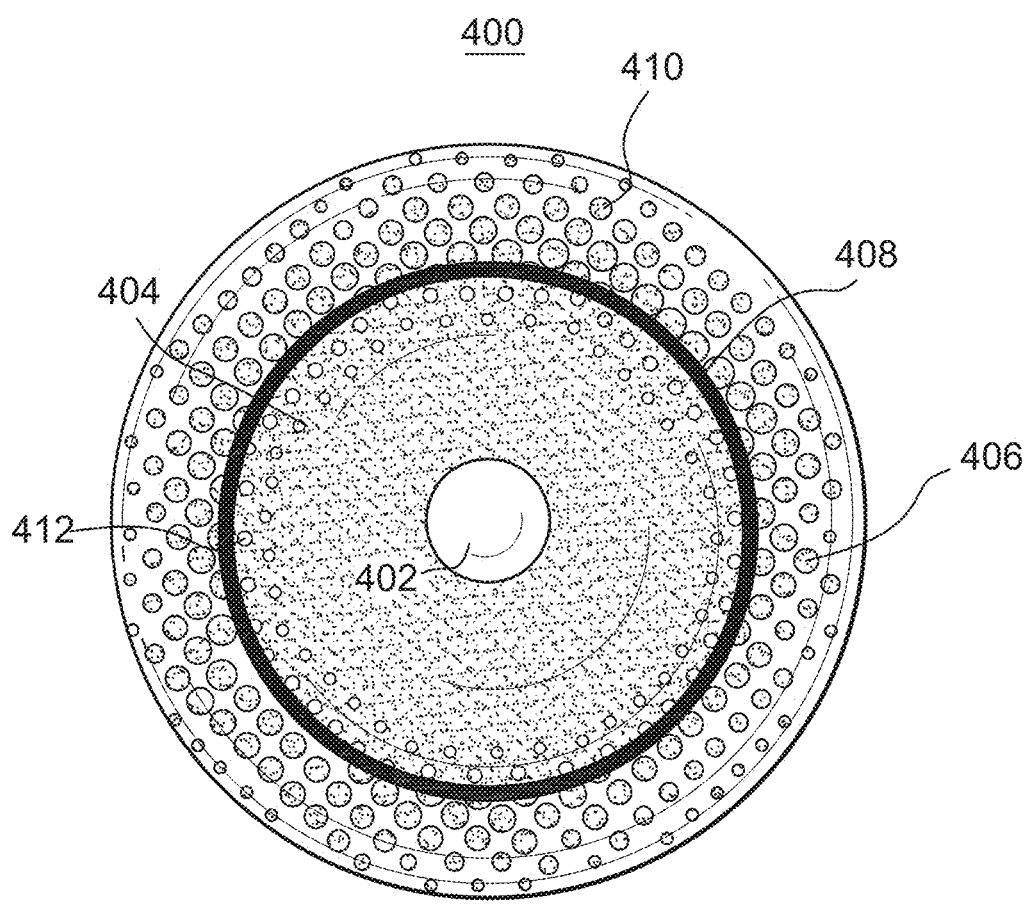
FIG. 4 is a plan view of a third exemplary cosmetic contact lens.

FIG. 4 illustrates a third exemplary cosmetic contact lens 400 with a bright coloring in the peripheral portion 406 applied in the form of a geometric pattern. The cosmetic contact lens 400 comprises a center region 402, a central portion 404 that surrounds the center region 402, the peripheral portion 406 that surrounds the central portion 404 and a limbal ring 408. The difference between the contact lens of FIGS. 3 and 4 lies in the geometric pattern in the peripheral portion 406. In this exemplary cosmetic lens 400, the geometric pattern takes on the appearance of circles 410 removed from the lens surface that would otherwise be colored white, so that each circle 410 touches its neighboring circle 410 at a tangent. While this exemplary embodiment utilizes circles 410 as the geometric shape, it is important to note that any geometric shape may be utilized. It may also be thought of as rows and columns of cross shaped brightly colored structures formed by the circles 410. As illustrated, circles 412 may also extend into the pattern in the central portion 404.

Figure 5:
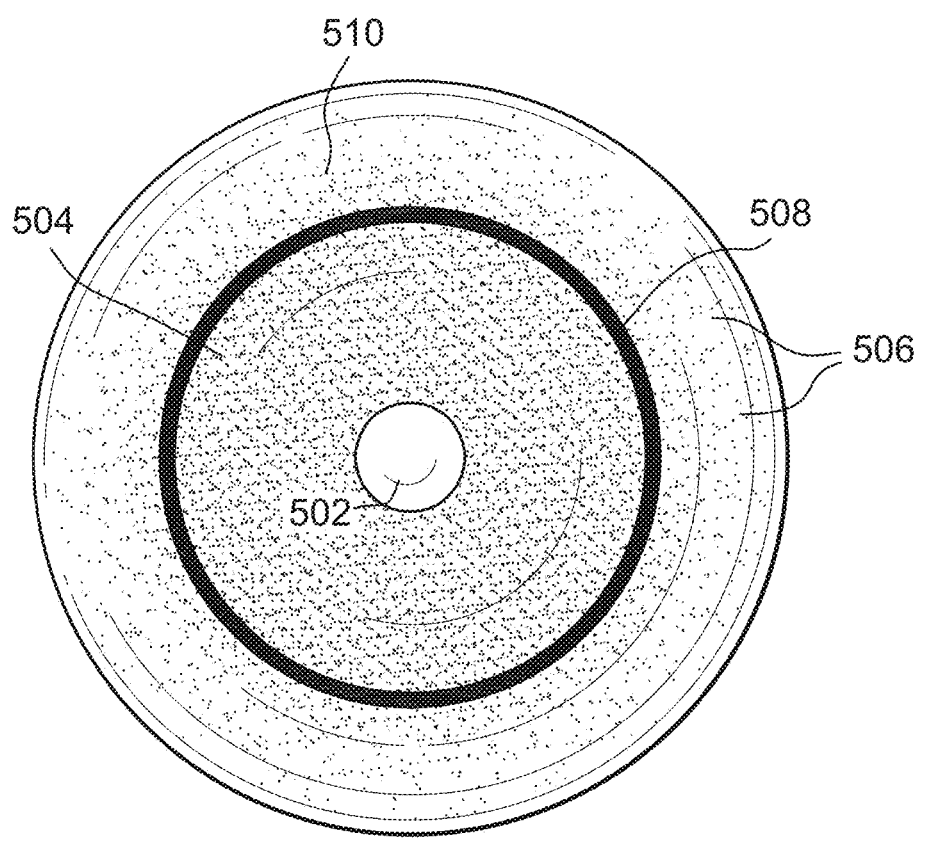
FIG. 5 is a plan view of a fourth exemplary cosmetic contact lens.

Patterning comprising geometric shapes may be formed from regularly shaped structures as described above with respect to FIG. 4, or from a plurality of random dots or shapes 510 which are in both the central portion 504 and the peripheral portion 506 of a cosmetic contact lens 500 as illustrated in FIG. 5. The central region 502 and the limbal ring 508 do not have patterns in this exemplary contact lens 500, for example, no spokes or blending. Any convenient shapes for conveying a realistic or enhanced sense of color may be utilized, particularly, where such geometric shapes contribute to a desired hue or shade. The dots utilized may comprise any size and shape. Dots aid in blending of the boarders of the different elements of the cosmetic contact lenses.

In accordance with other exemplary embodiments, a cosmetic lens may comprise a limbal ring and a plurality of tapered spokes. As set forth above, a limbal ring is an annular band of color that, when the lens is on-eye and centered, partially or substantially completely overlies the lens wearer's limbal region, or the junction of the sclera with the cornea. Preferably, the limbal ring substantially completely overlies the limbal region. The innermost border or edge closest to the geometric center of the lens, of the limbal ring may form a circle having a diameter of about 8 mm to about 12 mm, preferably about 9 to about 11 mm, the circle being centered at the lens' geometric center. The ring may be of any suitable width and preferably is about 0.5 to about 2.5 mm in width, more preferably about 0.75 to about 1.25 mm in width.

Extending inwardly from the innermost border of the limbal ring toward the geometric center of the lens are substantially triangular-shaped structures that resemble spokes in a wheel. The tapered spokes may, but preferably do not, extend over the entire iris portion of the lens, meaning the portion of the lens that overlies the iris when the lens is on-eye and centered. Rather, preferably the spokes extend inwardly from the innermost edge of the limbal ring so that the innermost edge of the spoke pattern is located at about 6.5 mm or more, more preferably about 7 mm or more from the geometric center of the lens. The spokes may be of uniform or varying shapes and sizes and preferably are about 1 to about 2 mm in length.

Figure 6:
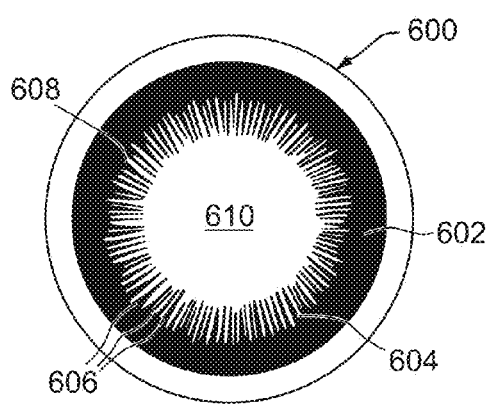
FIG. 6 is a plan view of a first exemplary limbal ring/spoke pattern cosmetic contact lens.

In FIG. 6, there is illustrated a first exemplary embodiment of the limbal ring-tapered spoke pattern on a contact lens 600. In this exemplary embodiment, the limbal ring 602 is a black opaque band that is approximately 1 mm in width. Beginning at the innermost border 604 of the limbal ring 602 and extending inwardly towards the geometric center of the contact lens 600 are a plurality of randomly arranged tapered spokes 606, the innermost border 612 of which forms a circle with a diameter of 7 mm as measured from the geometric center of the contact lens 600. Although all of the spokes 606 are generally similarly configured, preferably no one of the spokes 606 is exactly the same as another of the spokes 606. The spokes 606 are interspersed, or bordered, by spaces 608 in which spaces there are no elements. Spaces 608 are also generally all similarly configured, but preferably no one of the spaces 608 is of the exact same configuration as any of the other of the spaces 608 or spokes 606. Area 610 is a region in which there are no pattern elements, which area as shown will partially compose the iris portion of the wearer's eye as well as the whole of the pupil portion of the wearer's eye, or portion of the lens that overlies the wearer's pupil while the lens is on-eye and centered. As shown, area 610 is clear, but it may be translucently or opaquely colored as well. Innermost border 604 as shown is of an even, regular shape, but may be an uneven, irregular border. Similarly, although tapered spoke border 612 forms a substantially even border, it may form an uneven border.

Figure 7:
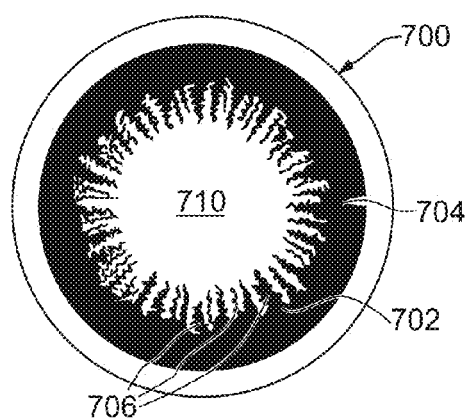
FIG. 7 is a plan view of a second exemplary limbal ring/spoke pattern cosmetic contact lens.

FIG. 7 illustrates an alternate tapered spoke pattern on a contact lens 700. In this exemplary embodiment, beginning at the innermost border 702 of the limbal ring 704 and extending inwardly towards the geometric center of the contact lens 700 is a plurality of randomly arranged tapered spokes 706. In this exemplary embodiment, tapered spokes 706 comprise one or more wavy lines that taper as one moves toward the geometric center of the contact lens 700. The innermost limbal ring border 702, as illustrated, is of an uneven, irregular shape. Area 708 is a region in which there is no pattern elements, which area will partially compose the iris portion of the wearer's as well as the whole of the pupil portion of the wearer's eye as described above.

Figure 8:
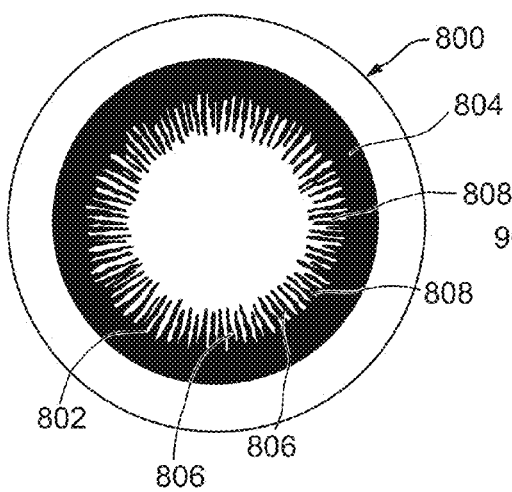
FIG. 8 is a plan view of a third exemplary limbal ring/spoke pattern cosmetic contact lens.

FIG. 8 illustrates yet another tapered spoke pattern on a contact lens 800. In this exemplary embodiment, beginning at the innermost border 802 of the limbal ring 804 and extending inwardly to the geometric center of the contact lens 800 are a plurality of spokes 806 and 808, with spokes 806 being longer than spokes 808 and both of which spokes 806, 808 are formed by wavy lines. As shown, spokes 806 and 808 are spaced at substantially regular intervals from one another, but may be irregularly spaced as well. Additionally, each of the spokes 806 are all of the substantially same shape, but they may be of differing shapes as may be the case for spokes 808. Area 810 is a region in which there are no pattern elements, which area will partially compose the iris portion of the wearer's eye as well as the whole of the wearer's pupil as described above.

Figure 9:
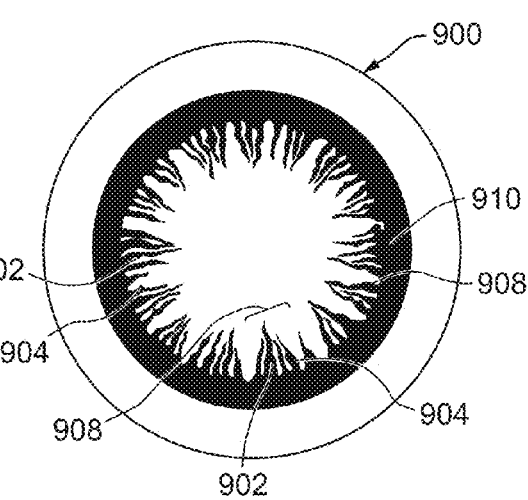
FIG. 9 is a plan view of a fourth exemplary limbal ring/spoke pattern cosmetic contact lens.

FIG. 9 illustrates still another exemplary tapered spoke pattern on a contact lens 900, which is a variation of the pattern illustrated in FIG. 8. In this exemplary embodiment, the spoke pattern has multiple spokes 902 and 904, with spokes 902 being longer than spokes 904, and both of which spokes 902, 904 are formed by wavy lines. As shown, spokes 902 and 904 are randomly grouped together to form clusters 906. These clusters 906 extend from the inner most radius 908 of limbal ring 910.

Figure 10:
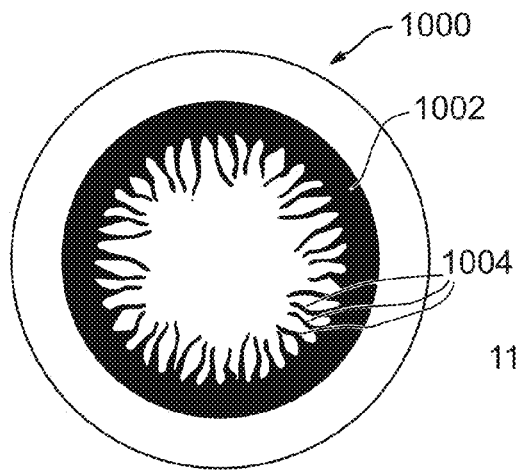
FIG. 10 is a plan view of a fifth exemplary limbal ring/spoke pattern cosmetic contact lens.

FIG. 10 illustrates an exemplary tapered spoke pattern on a contact lens 1000 in which there is a limbal ring 1002 and extending inwardly therefrom are a plurality of randomly spaced spokes 1004. In this exemplary embodiment, the spokes 1004 are bent at one or more locations.

In all of the patterns described with respect to FIGS. 6-10, the spokes may extend inwardly to the geometric center of the lens. Preferably, however, the innermost border of the spokes, or edge relative to the geometric center of the lens, is located at about 6.5 mm or greater, preferably about 7 mm or greater from the geometric center of the lens.

Figure 11:
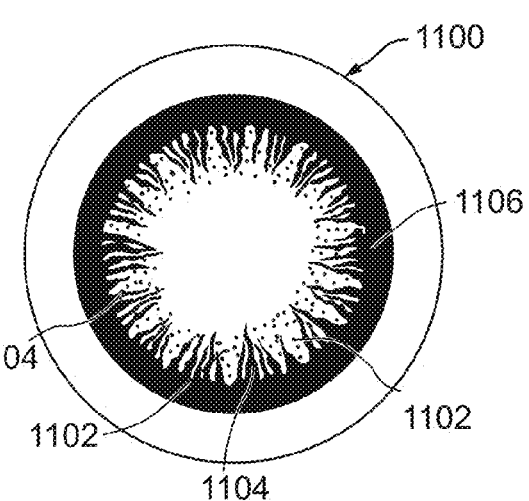
FIG. 11 is a plan view of a sixth exemplary limbal ring/spoke pattern cosmetic contact lens.

In addition to the spokes and limbal ring elements, the patterns may include any of a number of additional components. Such components may include geometric structures, such as dots and lines, or fanciful structures, including striae, feather-like shapes, and the like, and combinations thereof. In one exemplary embodiment, as illustrated in FIG. 11, a contact lens 1100 may comprise a plurality of random dots 1102 that overlay the spokes 1104 and the spaces between spokes 1104. Alternatively, the plurality of dots may overlay only a portion of the area of the spokes and spaces therebetween, such as overlaying only their innermost portions or portions closest to the limbal ring 1106 or about one (1) to about ninety (90) percent, preferably about twenty-five (25) to seventy-five (75) percent, of that area. As yet another alternative, the random dot pattern may be such that, as one moves inwardly toward the lens' geometric center, the dots become less numerous forming a dot density gradient. The dots aid in blending of the border between limbal ring 1106 and the spokes 1104.

Figure 12:
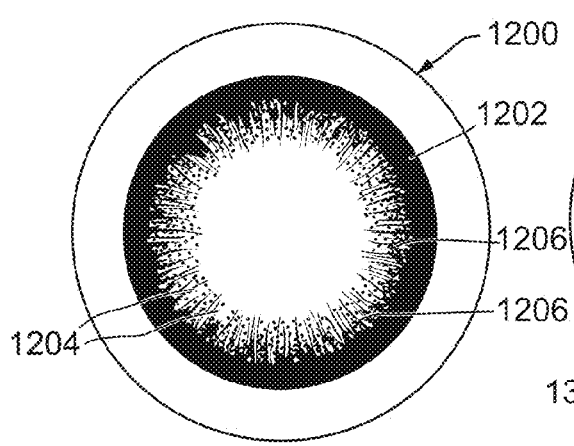
FIG. 12 is a plan view of a seventh exemplary limbal ring/spoke pattern cosmetic contact lens.

As yet another alternative, in FIG. 12, there is illustrated a contact lens 1200 having a plurality of random dots 1202 and lines 1204 overlaying spokes 1206 and the spaces between spokes 1206. The dots 1202 overlay the entirety of spokes 1206 and the spaces therebetween. Lines 1204 are arranged in a hatch-like distribution, meaning that the lines are in groups of two or more parallel lines, and overlay only a portion of the spokes and spaces therebetween. The dots used in the patterns of the invention may be of any size and preferably are about 0.060 to about 0.180 mm in diameter, more preferably about 0.0075 to about 0.0125 mm in diameter.

In any of the patterns of the cosmetic contact lenses set forth herein, the center preferably is clear to ensure no impact on visual acuity. However, the center region may be an area of translucent/transparent or opaque color or any combination of opaque and translucent/transparent colors.

As used in a contact lens for either enhancing or altering the wearer's eye color, preferably the limbal ring element is a solid band of color that masks the color of the lens wearer's limbal region and more preferably, the masking color is an opaque color. Once again, limbal rings, sized appropriately, may be utilized to create a halo effect. The remaining elements, the spokes, dots and other pattern elements may be translucent or opaque depending on the desired cosmetic on-eye result. For purposes of the invention, by "translucent" is meant a color that permits an average light transmittance (% T) in the 380 to 780 nm range of about 60 to about 99%, preferably about 65 to about 85% T. By "opaque" is meant a color that permits an average light transmittance (% T) in the 380 to 780 nm range of 0 to about 55, preferably 7 to about 50% T.

The color selected for each of the limbal ring and iris pattern elements will be determined by the natural color of the lens wearer's iris and the enhancement or color change desired. Thus, elements may be any color, including any of a variety of hues and chromas of blue, green, gray, brown, black, yellow, red, or combinations thereof. Preferred colors for the limbal ring include any of the various hues and chromas of black, brown, gray, dark blue and dark green.

Figure 13:
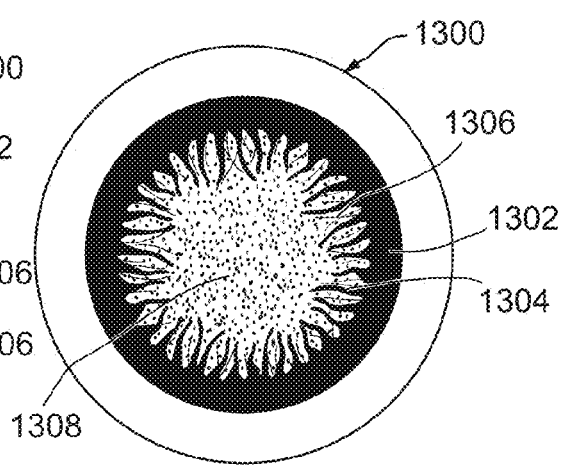
FIG. 13 is a plan view of an eighth exemplary limbal ring/spoke pattern cosmetic contact lens.

The color of the limbal ring, spokes and other pattern elements may also be substantially the same as, or complementary to, each other. For example, in FIG. 13 there is illustrated a contact lens 1300 comprising a pattern in which a limbal ring 1302 and spokes 1304 are of the same color. Spokes 1306 are of a different, but complementary color to that of limbal ring 1302 and spokes 1304. Pupil portion 1308 is of yet another color complementary to the limbal ring and spoke colors. Preferably, the pupil portion is clear, meaning that it is colorless.

The brightly colored element comprising the peripheral portion may be pure white, near white, off white, light yellow, pale blue, light pink, light green, or any combination of the above. Preferably, it is matched so that it does not starkly contrast with the visible portion of the sclera that is not covered by the lens. These colors are preferably obtained by use of $TiO_2$ with higher amounts yielding greater opacity and contrast. The addition of pigments include iron oxide black, iron oxide brown, iron oxide yellow, iron oxide red, titanium dioxide, and the like, and combinations thereof, in small amounts to adjust the whiter colored element. In addition to these pigments, soluble and non-soluble dyes may be used, including dichlorotriazine and vinyl sulfone-based dyes. One exemplary embodiment being a colorant with 10 percent to 20 percent $TiO_2$ and 80 percent to 90 percent clear binding polymer to provide appropriate translucency.

In general, the colored elements may be made from any organic or inorganic pigment suitable for use in contact lenses, or combinations of such pigments. The opacity may be controlled by varying the concentration of the pigment and titanium dioxide used, with higher amounts yielding greater opacity. Illustrative organic pigments include pthalocyanine blue, pthalocyanine green, carbazole violet, vat orange #1, and the like as well as combinations thereof. Examples of useful inorganic pigments include iron oxide black, iron oxide brown, iron oxide yellow, iron oxide red, titanium dioxide, and the like, as well as combinations thereof. In addition to these pigments, soluble and non-soluble dyes may be used, including dichlorotriazine and vinyl sulfone-based dyes. Useful dyes and pigments are commercially available.

The designs/patterns/colors for the different regions of a cosmetic contact lens are developed based upon market research. These patterns are then etched into metal structures generally referred to as a cliché. More specifically, a metal plate preferably made from steel and more preferably from stainless steel, is covered with a photo resist material that is capable of becoming water insoluble once cured. The patterns are selected or designed and then reduced to the desired size utilizing any of a number of suitable techniques such as photographic techniques, placed over the metal plate, and the photo resist material is cured. The metal plate or cliché is subsequently washed with an aqueous solution and the resulting image or pattern is etched into the metal plate to a suitable depth, for example, about twenty (20) microns. Once the cliché s are fabricated, a multi-step process is utilized to manufacture the cosmetic contact lens as described below.

Figure 14:
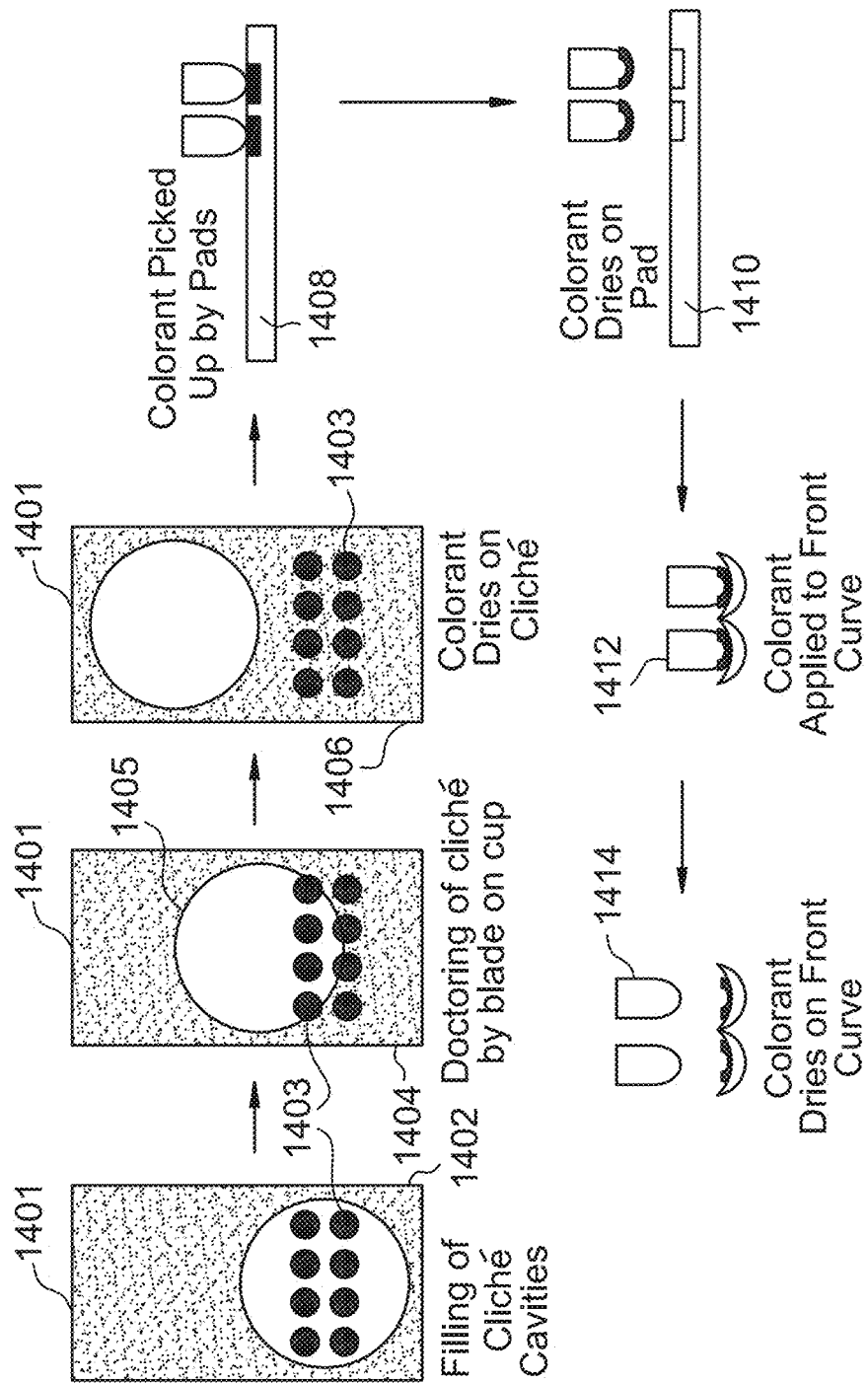
FIG. 14 is a diagrammatic representation of a generalized pad printing process.

FIG. 14 illustrates a general overview of the pad printing process utilized in the manufacturing process. The first step, 1402, in the process is filing of the cliché cavities with the desired colorant. The cliché 1401 comprises a number of cliché cavities 1403 with the particular pattern etched therein as described above. The second step, 1404, in the process involves the removal of excess ink or colorant from the surface of the cliché s 1401. Excess ink is typically removed from the surface of the cliché s 1401 through the use of a doctoring blade or doctoring blades on a cup 1405. In the third step, 1406, of the process, the colorant is dried on the cliché s 1401. In the fourth step, 1408, of the process, the colorant in the cliché's 1401 is picked up by pads. In the fifth step, 1410, of the process, the colorant is dried or is allowed to dry on the pads. In the sixth step, 1412, of the process, the colorant is transferred from the pads to the front curve surface wherein additional processing is performed as described below. In the seventh step, 1414, of the process, the colorant is dried or is allowed to dry on the front curve surface of the front curve mold half. The process is then repeated for any remaining effect layers.

Figure 15:
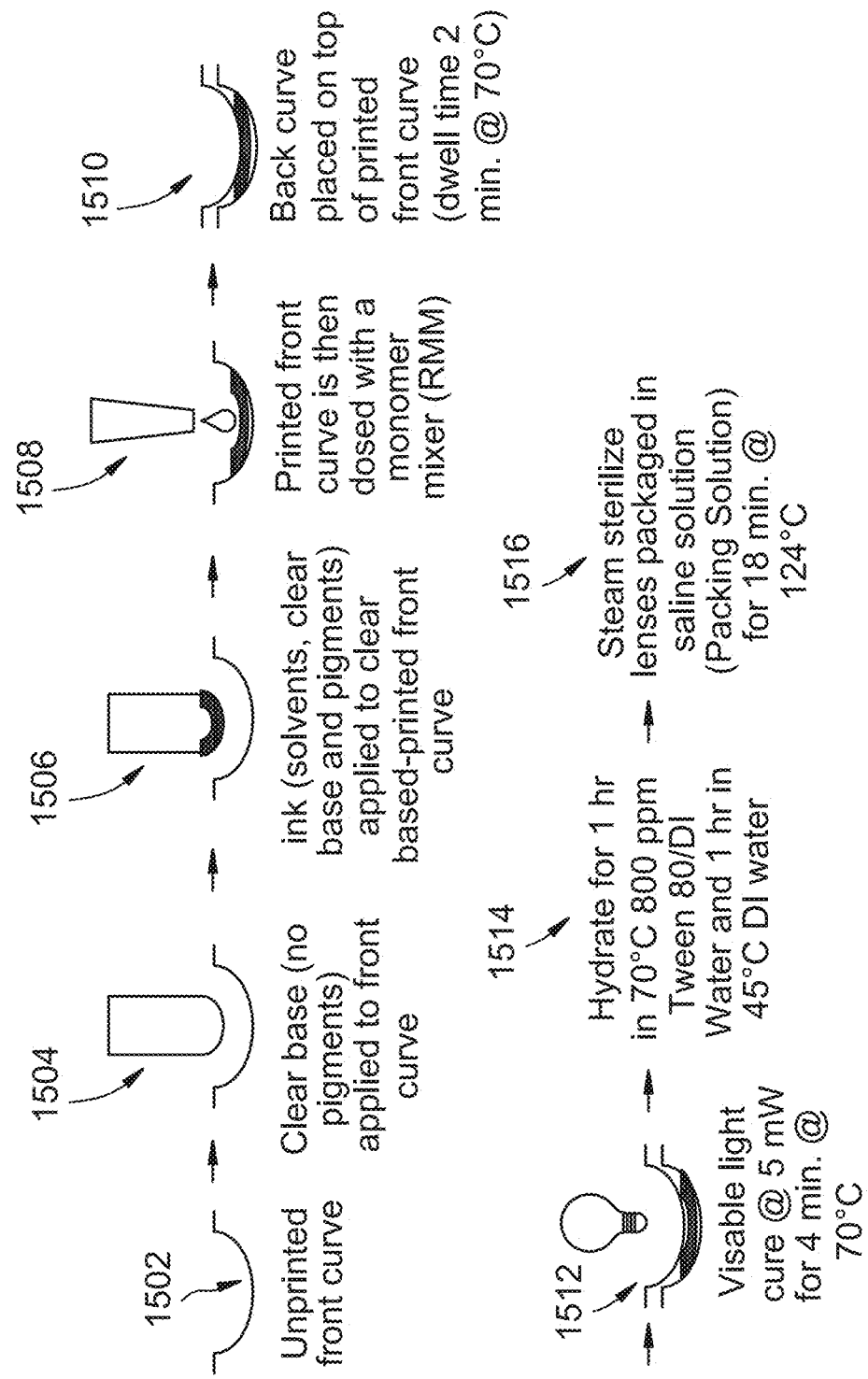
FIG. 15 is a diagrammatic representation of a more detailed pad printing process.

FIG. 15 provides a more detailed process description. In the first step, 1502, an unprinted front curve mold for the contact lens is provided. In the second step, 1504, a clear base, i.e. no pigment or dyes is applied to the front curve. The clear base depends on the lens material to be utilized as set forth in greater detail below. In the third step, 1506, ink, including solvents, clear base and pigments is applied to the clear base printed front curve. Once again, this is repeated until all effect layers and/or pigmented printed layers are applied to the clear base printed base curve. In the fourth step 1508, the printed front curve is then dosed with a reactive monomer mixture, for example, etafilcon-A. In the fifth step, 1510, of the process, the back curve mold for the contact lens is positioned on the front curve mold where it remains for two (2) minutes while the temperature is maintained at seventy (70) degrees C. In the sixth step, 1512, of the process, the reactive monomer mixture between the front and back curve is exposed to visible light for curing. This curing step utilizes visible light at five (5) mW for four (4) minutes at a temperature of seventy (70) degrees C. In the seventh step, 1514, of the process the contact lens from the mold is hydrated for one (1) hour in seventy (70) degrees C. solution of 800 ppm Tween 80 and de-ionized water and for an additional one (1) hour in forty-five (45) degree C. de-ionized water. In the eighth step, 1516, of the process, the contact lens is steam sterilized in its own packaged saline solution for eighteen (18) minutes at a temperature of one hundred twenty-four (124) degree C. It is important to note that the above-described process has been simplified for ease of explanation.

As set forth above, the lens forming material comprises etafilcon A. Etafilcon A is a well-known and patented material for manufacturing contact lenses. Etafilcon A is a copolymer of 2-hydroxyethal methacrylate and methacrylic acid cross-linked with 1, 1, 1-trimethyol propope trimethacrylate and ethylene glycol dimethacrylate. Etafilcon A is utilized in a number of contact lenses available from VISTA-KON® a division of Johnson & Johnson Vision Care, Inc. It is important to note that while etafilcon A is utilized in the exemplary embodiments described herein, any suitable lens forming material may be utilized. For etafilcon A, the preferred binding polymers are a random block copolymer of HEMA, and MAA or a homopolymer of HEMA. The weight percentages, based on the total weight of the binding polymer, of each component in these embodiments is about 93 to about 100 weight percent HEMA and about 0 to about 2 weight percent MAA.

Figure 16:
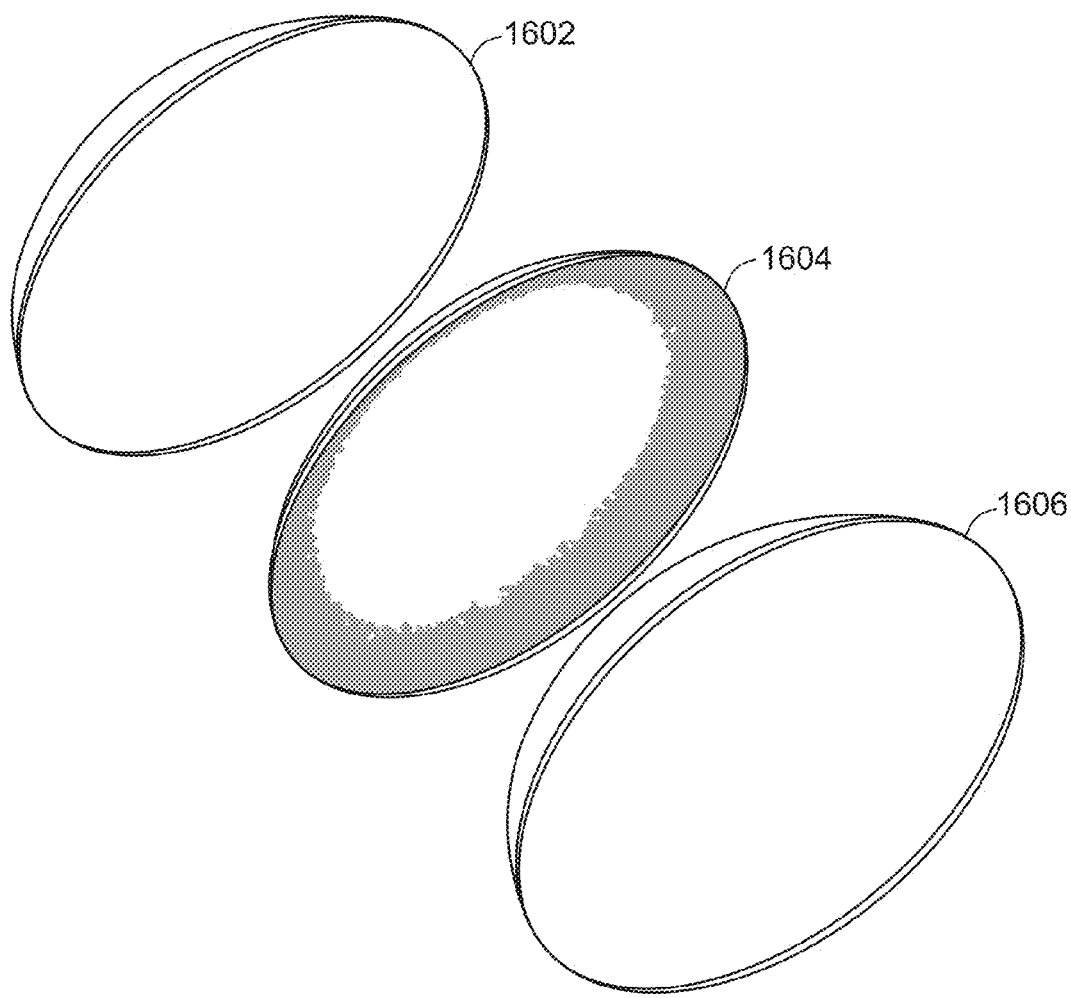
FIG. 16 is a diagrammatic representation of the layers comprising an exemplary contact lens.

FIG. 16 illustrates the basic structure of a cosmetic contact lens formed from the above described process. The one or more effect layers 1604 are sandwiched or encapsulated between the clear base 1602 and the bulk lens material 1606. Although only a single effect layer is illustrated, any number of effect layers or printed pigmented layers may be encapsulated between the other two layers. As illustrated, the contact lens comprises a full clear base layer to encapsulate the one or more pigmented printed layers within the lens material even though the one or more pigmented printed layers have a substantially annular structure. Even with spokes, no pigmented designs extend into the optical zone of the lens. In other words, with this design, the central optic zone or central optic area of the contact lens is covered with the clear base material. In order to maintain the precision optical surface and pathway and thus provide optimal vision, safety and comfort for the patient, the clear base material may be removed from the central optic areas by utilizing an annular pattern printing cliché to print the clear annular band on the front curve as opposed to the full coverage described in step 1504 above. The clear annular band may be sized to encapsulate or cover any design layer. More specifically, by properly dimensioning the cliché, the opening in the annular structure may be optimized to maintain optical quality while ensuring encapsulation of the pigmented print layers. As no design should enter the optical zone, there is no need to encapsulate anything in that region.

It is important to note that any number of terms may be utilized to describe the pigmented region that is encapsulated as set forth in this invention. For example, the pigmented layers may be referred to as effect layers, print layers, design layers and pigmented print layers.

FIGS. 17, 17A and 17B illustrate an exemplary embodiment of a cliché 1700 that may be utilized in accordance with the present invention. In this exemplary embodiment, the cliché 1700 is utilized to deposit clear base material on the front curve mold in a substantially annular pattern. The process described above with respect to the ink deposition is utilized with base coat material first in this exemplary embodiment. In other words, the process described above with respect to FIGS. 14 and 15 is utilized first to deposit the clear base coat material on the front curve mold in a position that will allow for encapsulation of the pigments comprising any suitable design while allowing for the central optic area; namely, the area corresponding to the pupillary region of an eye, to be free of any clear base coat material. The modified clear base cliché 1700 eliminates the presence of clear base coat material in the optic zone while covering any pigmented designs or eliminates the presence of clear base coat material while covering all remaining portions of the front of the contact lens. In other words, the clear base may extend past the design to the edge of the lens. The cliché 1700 comprises a first annular section 1702, a transition section 1706 and an optic area opening 1704. The first annular section 1702 may extend from a position corresponding to the edge of the contact lens or any point inset from the lens edge that corresponds to a position proximate to the pigmented design to the transition section 1706. In accordance with exemplary embodiments of the invention, the first annular section 1702 has an inner diameter of about 3.9 mm and an outer diameter of about 17 mm. In a preferred embodiment, the first annular section 1702 has an inner diameter of about 6 mm and an outer diameter of about 13.5 mm. The first annular section 1702 is the portion of the cliché 1700 which will pick up the clear base material for transfer to the pad. The transition section 1706 is a much smaller annular band that extends from the inner diameter of the first annular section 1702 to an outer diameter of the optic area opening 1704. In accordance with exemplary embodiments of the invention, the transition section 1706 has an inner diameter of about 1.9 mm and an outer diameter of about 8 mm. In a preferred embodiment, the transition section 1706 has an inner diameter of about 4.4 mm and an outer diameter of about 6 mm. The transition section 1706 is configured to hold a diminishing amount of clear base coat material as it approaches the optic area opening 1704 and this may be accomplished in a number of different ways as set forth in detail herein. As illustrated, the transition section 1706 comprises a dithering pattern or matrix that picks up a certain amount of base coat material for deposition on the front curve mold. The transition section or zone 1706 is utilized to better blend or integrate the two materials together. More specifically, the transition section 1706 with the pattern/matrix and diminishing amount of base coat material to be transferred provides for a better blending/integration of the clear base coat material and the lens monomer, thereby reducing any induced stress that may occur in the absence of the transition section 1706. In an exemplary embodiment, the transition section 1706 has a thickness of about 30 microns proximate the first annular section 1702 and a thickness of about 0 microns proximate the optic area opening 1704. In a preferred embodiment, the transition section 1706 has a thickness of about 20 microns proximate the first annular section 1702 and a thickness of about 10 microns proximate the optic area opening 1704. However, after pad printing, the printed front curve is dosed with reactive monomer mixture and the back curve mold is positioned on the front curve mold to form the lens as set forth in detail above with no change in thickness of the lens.

It is important to note that any suitable process or technique may be utilized to encapsulate a pigmented design as long as no base coat material is deposited in the central optic zone, but rather only lens monomer. In addition, it is important to note that the dimensions of the clear base coat material to be transferred from the cliché 1700 are based on factors such as pad geometry and hardness, and ultimately on lens swell and measurement techniques.

The exemplary transition section 1706 described above comprises both a pattern/matrix, illustrated in detail in the exploded view of FIG. 17A, and a thickness gradient, illustrated in detail in the exploded sectional view of FIG. 17B. However, other exemplary transition sections may comprise only one or the other rather than a combination as set forth above. Specifically, in an alternative exemplary embodiment, the transition section may comprise only a pattern/matrix wherein a decrease in the density of the pattern functions to reduce the thickness of the material thereby leading to a reduction in potential induced stress. In another alternate exemplary embodiment, a solid layer of a diminishing amount of material may be utilized thereby leading to a reduction in potential induced stress. The pattern/matrix, whether utilized alone or in combination with the thickness gradient profile may comprise any suitable pattern. For example, the pattern may comprise any suitable geometric design, a dithering design, a dot matrix design or any random design. The design illustrated in FIGS. 17 and 17A are a basic design with the density of the features decreasing from the first annular section 1702 towards the optic area opening 1704.

Figure 18:
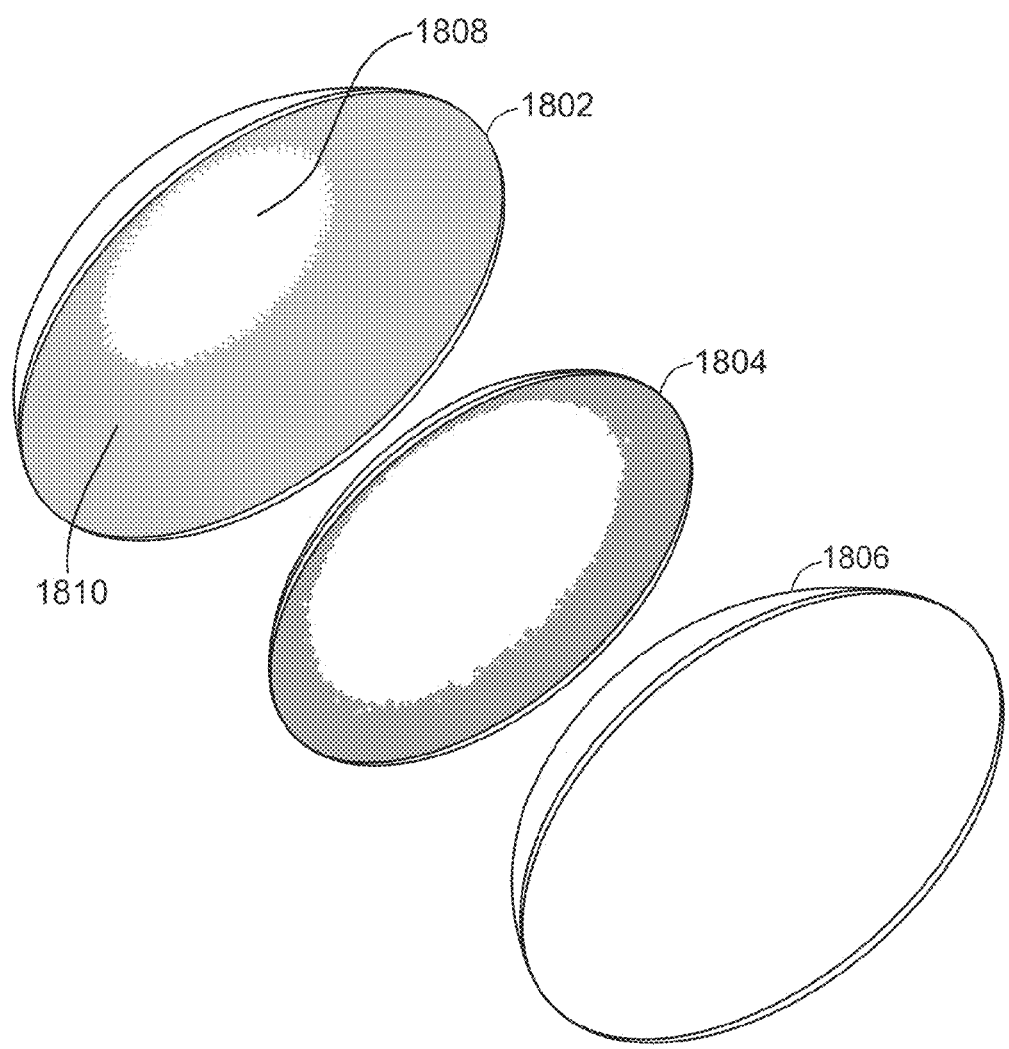
FIG. 18 is a diagrammatic representation of the layers comprising a cosmetic contact lens having an annular clear base layer in accordance with the present invention.

FIG. 18 illustrates the basic structure of a cosmetic contact lens formed from the above described process in accordance with the present invention. The one or more effect layers and/or pigmented print layers 1804 are sandwiched or encapsulated between the annular shaped clear base 1802 and the bulk lens material 1806. As before, although only a single effect layer is illustrated, any number of effect layers may be encapsulated between the other two layers. As illustrated, the contact lens comprises an annular shaped clear base material layer 1802 to encapsulate the one or more pigmented printed layers within the bulk lens material; namely, the reactive monomer mixture. In other words, with this design, the central optic zone or central optic area 1808 of the contact lens is not covered thereby maintaining a precision optical surface and pathway in addition to maintaining a high degree of comfort while ensuring full coverage/encapsulation of the pigmented layer 1804. The design of the cliché 1700 with the transition section 1706 creates a transition region 1810 in the annular shaped clear base layer 1802 which provides for better blending/integration between the materials as described in detail above. In accordance with exemplary embodiments of the invention, the opening 1808 has a diameter ranging from about 1.9 mm to about 8.8 mm and in a preferred embodiment has a diameter of about 5.75 mm.

In an alternate exemplary embodiment wherein a cosmetic or non-cosmetic contact lens is coated, whether on the front surface, the back surface or both surfaces for other reasons than encapsulating pigments, for example, a lubricious coating for comfort, it may be desirable to utilize the annular structure with a transition section disclosed herein to better blend/integrate the materials while maintaining high optical quality. More specifically, if a contact lens were formed from a first material and then a second material was added on one or both of the surfaces to increase the lubriciousness of the lens, the blending of the two materials may induce stress as described above. The solution would once again be an annular coating/structure with a transition section as set forth above to reduce any potential induced stress.

Although shown and described in what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. A cosmetic contact lens, the cosmetic contact lens comprising:
   an annular shaped clear coat layer formed from a first material, wherein the annular shaped clear coat layer comprises a first annular section, a transition section and an optic area opening section, the optic opening area being free of the first material and the transition section being thinner proximate the optic area opening section with a thickness of about 10 microns and thicker proximate the first annular section with a thickness of about 20 microns;
   one or more effect layers; and
   bulk lens material, the one or more effect layers being encapsulated between the annular shaped clear coat layer and the bulk lens material with the bulk lens material filling the optic area opening.

2. The cosmetic contact lens according to claim 1, wherein the transition section comprises a pattern.

3. The cosmetic contact lens according to claim 2, wherein the pattern comprises a geometric pattern.

4. The cosmetic contact lens according to claim 2, wherein the pattern comprises a dot matrix pattern.

5. The cosmetic contact lens according to claim 2, wherein the pattern comprise a dithering pattern.

6. The cosmetic contact lens according to claim 2, wherein the pattern comprises a higher density of features proximate the first annular section that diminishes to a lower density of features proximate the optic area opening.

* * * * *